US010333451B2

(12) United States Patent
Ortmann

(10) Patent No.: US 10,333,451 B2
(45) Date of Patent: Jun. 25, 2019

(54) CONTROLLER AND METHOD FOR DETECTING A BLOCKED STATE OF AN ELECTRICAL MACHINE

(71) Applicant: Magna Powertrain Bad Homburg GmbH, Bad Homburg (DE)

(72) Inventor: Dierk Ortmann, Schöllkrippen (DE)

(73) Assignee: MAGNA POWERTRAIN BAD HOMBURG GMBH, Bad Homburg (DE)

( * ) Notice: Subject to any disclaimer, the term of this patent is extended or adjusted under 35 U.S.C. 154(b) by 2 days.

(21) Appl. No.: 15/543,406

(22) PCT Filed: Jan. 15, 2016

(86) PCT No.: PCT/US2016/013540
§ 371 (c)(1),
(2) Date: Jul. 13, 2017

(87) PCT Pub. No.: WO2016/115428
PCT Pub. Date: Jul. 21, 2016

(65) Prior Publication Data
US 2017/0373631 A1    Dec. 28, 2017

Related U.S. Application Data

(60) Provisional application No. 62/104,287, filed on Jan. 16, 2015.

(51) Int. Cl.
H02P 27/06    (2006.01)
H02P 29/024   (2016.01)
(Continued)

(52) U.S. Cl.
CPC .......... *H02P 29/024* (2013.01); *B60L 3/0061* (2013.01); *H02P 23/0077* (2013.01);
(Continued)

(58) Field of Classification Search
CPC ...... H02P 23/14; H02P 23/0077; H02P 23/16; H02P 27/06; H02P 29/024;
(Continued)

(56) References Cited

U.S. PATENT DOCUMENTS 6,215,261 B1 *   4/2001  Becerra ................. H02P 6/085
                                                  318/400.26
6,888,280 B2    5/2005  Dube et al.
(Continued)

FOREIGN PATENT DOCUMENTS

CN    103490398 A      1/2014
CN    103852625 A      6/2014
DE    102010049169 A1  4/2012

OTHER PUBLICATIONS

International Search Report and Written Opinion dated Mar. 18, 2016 from International Patent Application No. PCT/US2016/013540.

(Continued)

*Primary Examiner* — Muhammad S Islam
(74) *Attorney, Agent, or Firm* — Dickinson Wright PLLC

(57) ABSTRACT

A blockage detector for detecting a blocked state of an electrical machine has: a first power determiner and a second power determiner for determining a first power consumption and a second power consumption of the electrical machine while a first phase voltage and a second phase voltage for operating at a first rotating field speed and a second rotating field speed are applied to the electrical machine, a quotient former for producing a power quotient between the first power consumption and the second power consumption; and a comparator for comparing the power quotient with a threshold value for the power quotient. The invention also relates to an inverter controller, an inverter, a drive, ventilation or air-conditioning system and a vehicle having a blockage detector according to the invention. In addition, the (Continued)

invention relates to a corresponding method for detecting a blocked state of an electrical machine.

15 Claims, 7 Drawing Sheets

(51) Int. Cl.
| | |
|---|---|
| H02P 23/14 | (2006.01) |
| H02P 23/16 | (2016.01) |
| B60L 3/00 | (2019.01) |
| H02P 23/00 | (2016.01) |
| B60L 1/02 | (2006.01) |

(52) U.S. Cl.
CPC .............. *H02P 23/14* (2013.01); *H02P 23/16* (2016.02); *H02P 27/06* (2013.01); *H02P 29/0241* (2016.02); *B60L 1/02* (2013.01); *B60L 2210/40* (2013.01); *B60L 2220/16* (2013.01); *B60L 2240/421* (2013.01); *B60L 2240/423* (2013.01); *B60L 2240/425* (2013.01); *B60L 2240/427* (2013.01); *Y02T 10/642* (2013.01)

(58) Field of Classification Search
CPC ........... B60L 2220/16; B60L 2240/421; B60L 2240/425; B60L 3/0061; Y02T 10/642
See application file for complete search history.

(56) References Cited

U.S. PATENT DOCUMENTS

| | | | |
|---|---|---|---|
| 7,239,103 B2* | 7/2007 | Ho | H02P 21/141 |
| | | | 318/430 |
| 8,405,330 B2 | 3/2013 | Leong et al. | |
| 2004/0104637 A1 | 6/2004 | Dube et al. | |
| 2004/0249518 A1 | 12/2004 | Okoshi et al. | |
| 2010/0109437 A1* | 5/2010 | Fattic | B60K 6/48 |
| | | | 307/47 |
| 2012/0025790 A1 | 2/2012 | Noguchi et al. | |
| 2012/0176072 A1 | 7/2012 | Leong et al. | |
| 2012/0280645 A1* | 11/2012 | Olsson | H02P 23/0077 |
| | | | 318/802 |
| 2014/0184117 A1* | 7/2014 | Fernengel | H02H 7/1225 |
| | | | 318/400.21 |

OTHER PUBLICATIONS

"AC Drives: An Introduction", on-line retrieval at URL: https://web.archive.org/web/20140626145917/http://www.industrial-electronics.com/output_devices_amplifiers_valves_relays_variable-frequency_drives_stepper_motors_servomotors/AC-drives.html; Mar. 3, 2016 (ten pages).

Search Report dated Oct. 26, 2018 in corresponding Chinese Patent Application No. CN201680005977.X.

* cited by examiner

CONTROLLER AND METHOD FOR DETECTING A BLOCKED STATE OF AN ELECTRICAL MACHINE

CROSS-REFERENCE TO RELATED APPLICATIONS

This application is a National Stage of International Application No. PCT/US2016/013540 filed Jan. 15, 2016, which claims the benefit of U.S. Provisional Patent Application Ser. No. 62/104,287 filed Jan. 16, 2015. The entire disclosures of each of the above applications being considered part of the disclosure of this application and hereby incorporated by reference.

BACKGROUND OF THE INVENTION

The invention relates to a blockage detector for detecting a blocked state of an electrical machine. The electrical machine may be a rotating field machine or a linear machine. In particular, the electrical machine may be a brushless DC motor.

The invention also relates to an inverter controller having a blockage detector.

In addition, the invention relates to an inverter having an inverter controller which has a blockage detector.

Furthermore, the invention relates to a brushless DC motor having such an inverter and to a drive, ventilation or air-conditioning system having such a brushless DC motor. The invention also relates to a vehicle having such a drive, ventilation or air-conditioning system.

The invention also relates to a method for detecting a blocked state of an electrical machine.

DE 10 2010 049 169 A1 describes a monitoring computer for calculating a monitoring speed of a brushless DC machine by means of a field-oriented machine model without a speed sensor. If a discrepancy between the monitoring speed and a rotary transducer signal is outside a tolerance range, an operating fault (for example on account of a sensor error) is inferred. In order to also be able to record the monitoring speed in an operating range around zero hertz using the sensorless method, it is proposed to apply test signals to the stator windings. Providing the test signals is associated with an additional amount of effort.

SUMMARY OF THE INVENTION

An object of the present invention is to provide another reliable method for detecting a blockage in a brushless DC motor, which method can be implemented in a cost-effective manner and does not have a speed sensor.

This object is achieved with a blockage detector for detecting a blocked state of an electrical machine, the blockage detector having a first power determiner for determining a first power consumption of the electrical machine while a first phase voltage for operating the electrical machine at a first rotating field speed is applied to the electrical machine; a second power determiner for determining a second power consumption of the electrical machine while a second phase voltage for operating the electrical machine at a second rotating field speed is applied to the electrical machine; a quotient former for producing a power quotient between the first power consumption and the second power consumption; and a comparator for comparing the power quotient with a threshold value for the power quotient, with an inverter controller which is set up to generate a first control signal for an inverter for operating the electrical machine at a first rotating field speed and is also set up to generate a second control signal for the inverter for operating the electrical machine at a second rotating field speed, with an inverter, with a brushless DC motor, with a drive, ventilation or air-conditioning system, with a vehicle having a drive, ventilation or air-conditioning system with a brushless DC motor having an inverter having an inverter controller which is set up to generate a first control signal for an inverter for operating the electrical machine at a first rotating field speed and is also set up to generate a second control signal for the inverter for operating the electrical machine at a second rotating field speed and with a method for detecting a blocked state of an electrical machine wherein the method comprising determining a first power consumption of the electrical machine while a first phase voltage for operating the electrical machine at a first rotating field speed is applied to the electrical machine; determining a second power consumption of the electrical machine while a second phase voltage for operating the electrical machine at a second rotating field speed is applied to the electrical machine; producing a power quotient between the first power consumption and the second power consumption; and comparing the power quotient with a threshold value for the power quotient.

A blockage detector according to the invention for detecting a blocked state of an electrical machine comprises a first and a second power determiner, a quotient former and a comparator. The first power determiner is set up to determine a first power consumption of the electrical machine while a first phase voltage for operating the electrical machine at a first rotating field speed is applied to the electrical machine. The second power determiner is set up to determine a second power consumption of the electrical machine while a second phase voltage for operating the electrical machine at a second rotating field speed is applied to the electrical machine. The quotient former is set up to produce a power quotient between the first power consumption and the second power consumption. The comparator is set up to compare the power quotient with a threshold value for the power quotient. The phase voltage is the time-variable voltage of a phase of a three-phase system for supplying windings (these are typically stator windings) of the electrical machine. The three-phase system typically has three phases. It is also typically symmetrical.

An inverter controller according to the invention has a blockage detector according to the invention. An inverter according to the invention has an inverter controller according to the invention. A brushless DC motor according to the invention has an inverter according to the invention having an inverter controller according to the invention. The inverter is typically set up to electronically commutate the electrical machine of the brushless DC motor.

A drive, ventilation or air-conditioning system according to the invention has a brushless DC motor according to the invention. A vehicle according to the invention has a drive, ventilation or air-conditioning system according to the invention.

A method according to the invention for detecting a blocked state of an electrical machine comprises the following steps. In a first step, a first power consumption of the electrical machine is determined while a first phase voltage for operating the electrical machine at a first rotating field speed is applied to the electrical machine. In a second step, a second power consumption of the electrical machine is determined while a second phase voltage for operating the electrical machine at a second rotating field speed is applied to the electrical machine. In a third step, a power quotient between the first power consumption and the second power consumption is produced. In a fourth step, the power quotient is compared with a threshold value for the power quotient.

In this case, it is assumed that the power consumption determined by the respective power determiner is not a desired power consumption but rather an actual power consumption. For the concept according to the invention in its most general definition, it is irrelevant how the respective power determiner determines the actual power consumption. In order to determine the respective power consumption, an intensity of an actual current consumption of the electrical machine and/or of an inverter which drives the electrical machine is first of all typically determined. This determined value of the actual current consumption is then multiplied by a determined actual operating voltage, with which the inverter is supplied, or by a desired operating voltage which is assumed to be applied to the input of the inverter during the start-up process. The input of the inverter is typically supplied with electrical energy from a DC voltage source. It is typically assumed that the recording of the power consumption at the first rotating field speed and the recording of the power consumption at the second rotating field speed are carried out during the start-up process with a mechanical load (for example a fan or a pump).

A concept of the invention may be seen in the fact that the power consumption quotient of the power consumptions of two different rotating field speeds is much less dependent on the operating temperature than on whether or not the brushless DC motor is mechanically blocked. This is because the power consumption quotients in the blocked state always greatly differ (under otherwise identical boundary conditions) from power consumption quotients in the non-blocked state. A power consumption quotient may always be much lower than a particular threshold value in the blocked state, for example, and may always be much greater than this threshold value in the non-blocked state. It is therefore possible to stipulate a threshold value which is independent of the operating temperature. The concept of the present invention is therefore based on the fact that the power consumption quotient of the power consumptions of two different rotating field speeds is particularly suitable for a simple evaluation (by means of a comparison with the threshold value and a decision based thereon) as regards whether or not the brushless DC motor is blocked. It is expedient to select a value for the threshold value which is an arithmetic mean between a lowest power consumption quotient in the non-blocked state and a highest power consumption quotient in the blocked state.

In one advantageous embodiment, the first power determiner has a first current consumption determiner for determining a current consumption of the electrical machine, the first power determiner being set up to determine the first power consumption taking into account the current consumption determined by the first current consumption determiner. Alternatively or additionally, the second power determiner may have a second current consumption determiner for determining a current consumption of the electrical machine, the second power determiner being set up to determine the second power consumption taking into account the current consumption determined by the second current consumption determiner. The same current consumption determiner is typically used for both power determiners. The current consumption determiner of the first power determiner typically uses a current sensor to record a current consumption of the inverter and/or of the electrical machine. The current consumption determiner of the second power determiner also typically uses the same current sensor or a further current sensor to record a current consumption of the inverter and/or of the electrical machine. If the first or the second power determiner has the respective current consumption determiner for determining a current consumption of the electrical machine, this may facilitate optimal adaptation of the current consumption determiner to other components of the power determiner and vice versa.

In another advantageous embodiment, the first power determiner has a first voltage determiner for determining a supply voltage for the electrical machine, the first power determiner being set up to determine the first power consumption taking into account the supply voltage determined by the first voltage determiner. Alternatively or additionally, the second power determiner has a second voltage determiner for determining a supply voltage for the electrical machine, the second power determiner being set up to determine the second power consumption taking into account the supply voltage determined by the second voltage determiner. The same voltage determiner is typically used for both power determiners. The voltage determiner of the first power determiner typically uses a voltage sensor to record a supply voltage applied to the inverter. The voltage determiner of the second power determiner also typically uses the same voltage sensor or a further voltage sensor to record a supply voltage applied to the inverter. If the first or the second power determiner has the respective voltage determiner for determining a supply voltage applied to the inverter, this can facilitate optimal adaptation of the voltage determiner to other components of the power determiner and vice versa.

In another expedient embodiment, the blockage detector comprises a temperature determiner for determining a temperature of the electrical machine, and a threshold value determiner for determining the threshold value taking into account the temperature of the electrical machine determined by the temperature determiner. The same temperature determiner is typically used for both power determiners. The temperature determiner of the first power determiner typically uses a temperature sensor to record a temperature of the electrical machine. The temperature determiner of the second power determiner also typically uses the same temperature sensor or a further temperature sensor to record a temperature of the electrical machine. If the first or the second power determiner has the respective temperature determiner for determining a temperature of the electrical machine, this may facilitate optimal adaptation of the temperature determiner to other components of the power determiner and vice versa.

BRIEF DESCRIPTION OF THE DRAWINGS

The invention is explained in more detail below using an exemplary embodiment illustrated in the schematic drawings, in which.

DETAILED DESCRIPTION OF THE DRAWINGS

In the figures, the same reference symbols are respectively used for corresponding components. Therefore, explanations based on reference symbols also apply throughout the figures unless otherwise revealed from the context.

Figure 1:
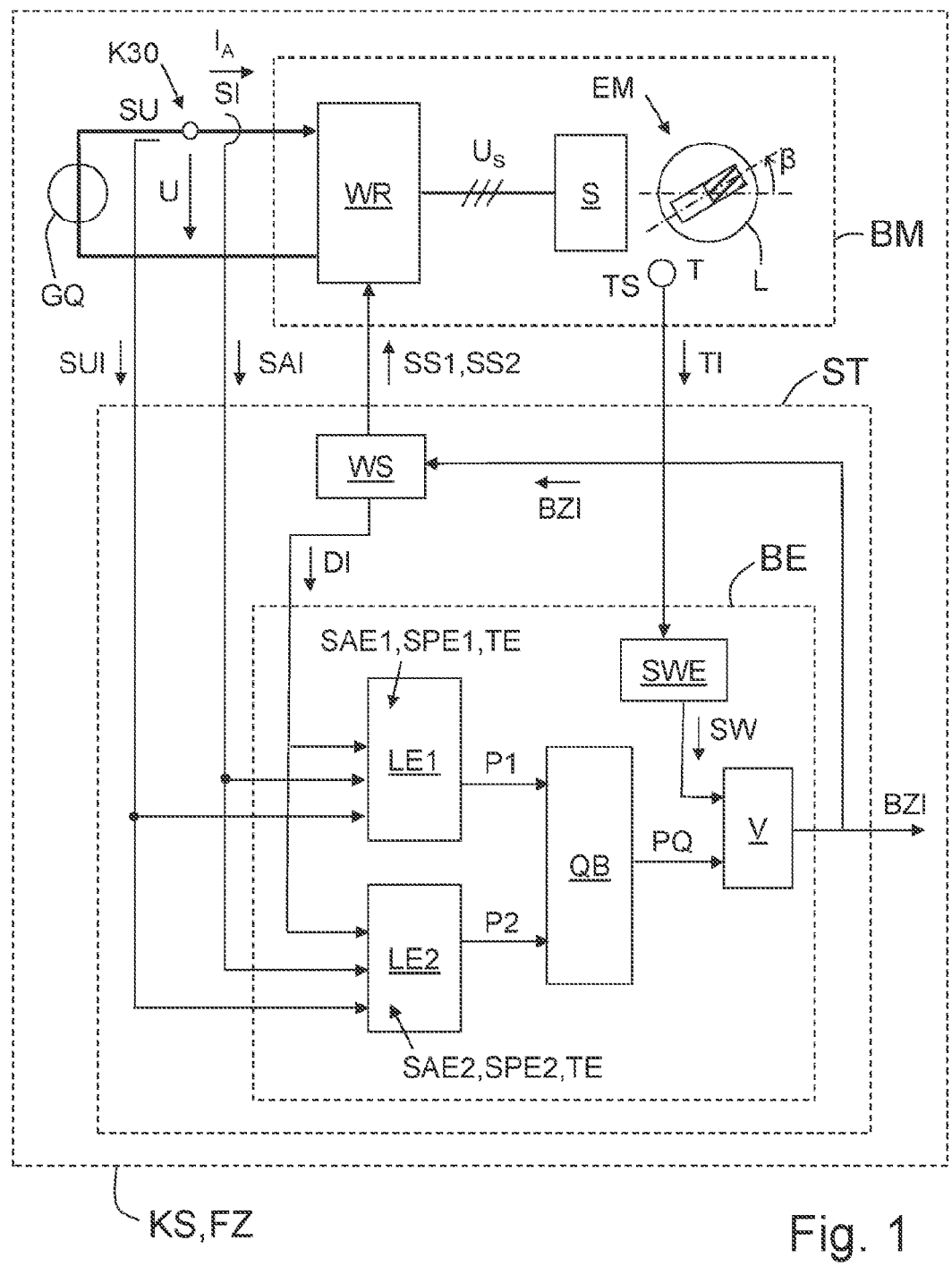
FIG. 1 shows a schematic block diagram of a brushless DC motor which is connected to a DC voltage source and has blockage detection according to the invention for the brushless DC motor.

The vehicle FZ schematically illustrated in FIG. 1 comprises a DC voltage source GQ to which a brushless DC motor BM is connected. The brushless DC motor BM has an inverter WR which is set up as a three-phase source for energizing a stator S of the brushless DC motor BM. A rotor L of the brushless DC motor BM has at least one permanent magnet. The angle β denotes an angular position of the rotor L relative to the stator S. The vehicle FZ has a controller ST which is set up to provide control signals SS1 for controlling the inverter WR for operation of the brushless DC motor BM at a first electrical angular velocity $\omega_1$ and control signals SS2 for operation of the brushless DC motor BM at a second electrical angular velocity $\omega_2$.

The proportionality factor between the electrical angular velocity co and the electrical frequency f of the phase voltage $U_S$ is $2\pi$:

$$\omega = 2\pi f \qquad \text{(equation 1)}.$$

The proportionality factor between the electrical frequency f of the phase voltage $U_S$ and the mechanical speed n (of the rotor L) of the electrical machine EM is a pole pair number p of the electrical machine:

$$n*p = f = \omega/2\pi \qquad \text{(equation 2)}.$$

The controller ST comprises an inverter controller WS and a blockage detector BE. The inverter controller WS is set up to generate the control signals SS1, SS2 for controlling the inverter WR. In the embodiment in FIG. 1, the inverter controller WS is a voltage controller which generates control signals SS1, SS2 which are used (in the situation without a blockage) to effect a predefined profile of the current consumption $I_A$ of the brushless DC motor BM against the electrical angular velocity co under assumed and/or recorded operating conditions (for example supply voltage U and operating temperature T of the electrical machine) during the start-up control of the brushless DC motor BM.

The blockage detector BE for detecting a blocked state of an electrical machine EM comprises a first power determiner LE1 and a second power determiner LE2 for determining a first power consumption $P_1$ and a second power consumption $P_2$ of the electrical machine EM while a first phase voltage $U_{S1}$ and a second phase voltage $U_{S2}$ for operation at a first rotating field speed and a second rotating field speed are applied to the electrical machine EM. The blockage detector BE also comprises a quotient former QB for producing a power quotient PQ between the first power consumption $P_1$ and the second power consumption $P_2$ and a comparator V for comparing the power quotient PQ with a threshold value SW for the power quotient PQ.

The comparison result BZI can be used for one or more of the following purposes, for example:

aborting a start-up process if a blockage is detected or continuing the start-up process if the absence of a blockage is detected (for example approximately 5 ms after detecting the absence of a blockage);

initiating an actual run-up process (following the start-up process) if the absence of a blockage is detected (for example approximately 5 ms after detecting the absence of a blockage);

activating an energization scheme for releasing the electrical machine EM from the blocked state (for example by means of reversing operation);

incrementing an error memory in the event of a blockage and/or decrementing the error memory in the event of the absence of a blockage; and/or sending an item of warning or maintenance information (for example via a vehicle bus).

For this purpose, the comparison result BZI can be made available to the inverter controller WS. The actual run-up process is typically carried out with a maximum permissible power consumption P on the basis of the operating point and/or up to a maximum permissible motor speed.

Figure 2:
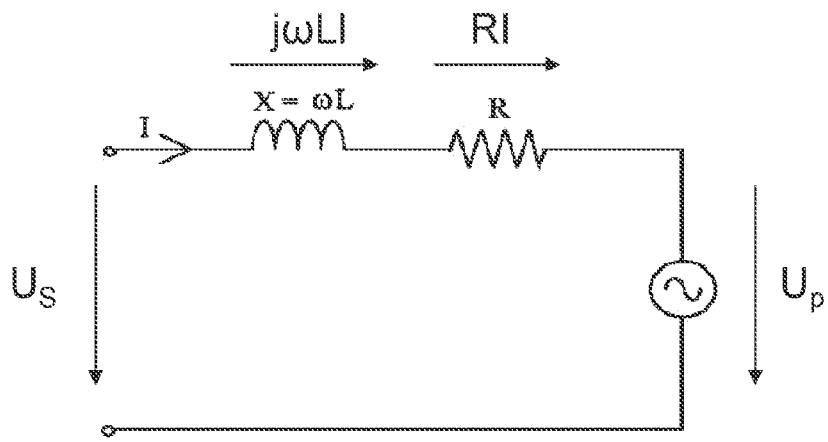
FIG. 2 shows an electrical equivalent circuit diagram of the electrical machine of the brushless DC motor.

FIG. 2 shows a single-phase equivalent circuit diagram (known per se) of the electrical machine EM of a brushless DC motor BM. This series circuit substantially consists of a stator inductance L, a stator resistor R and an ideal voltage source for a rotor voltage $U_p$ proportional to the speed. The brushless DC motor BM typically has a design-specific speed constant $k_n$ which can be used to calculate the rotor voltage $U_p$ proportional to the speed according to the following equation:

$$U_p = n*k_n = (f/p)*k_n = (\omega/2\pi p)*k_n \qquad \text{(equation 3)}.$$

Figure 3:
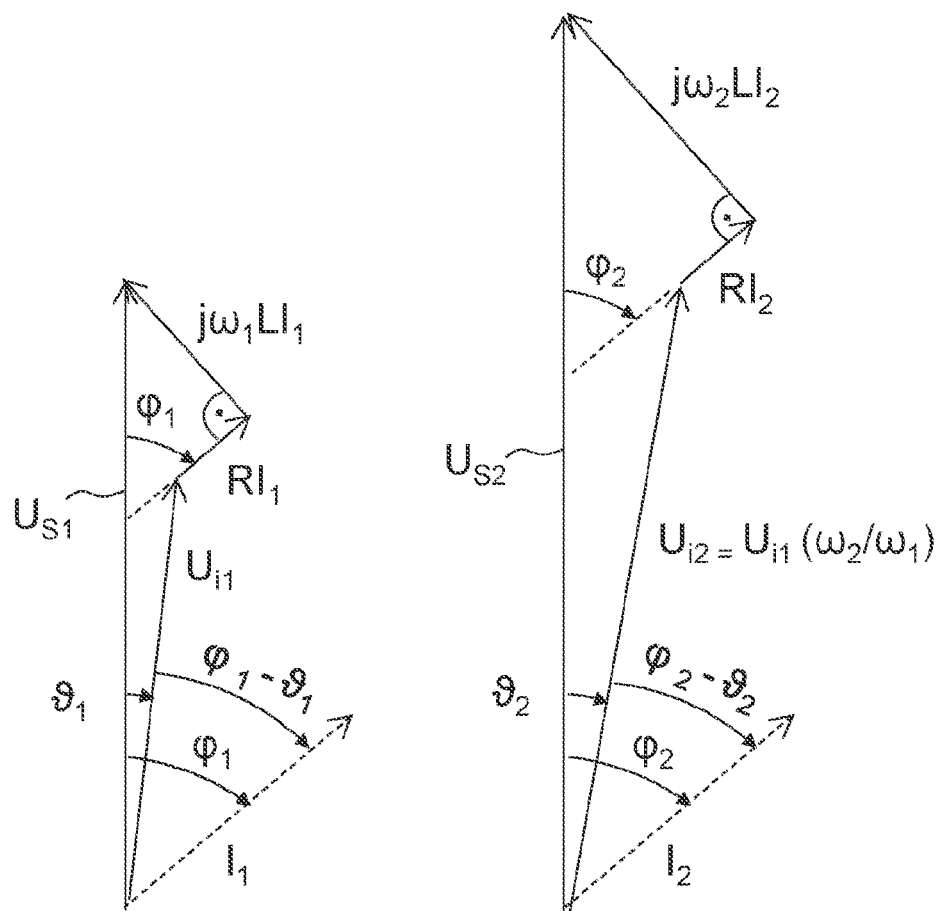
FIG. 3 shows a respective schematic vector diagram for (quasi-stationary) motor operation of the brushless DC motor at a first rotating field speed and a second rotating field speed.

The vector diagrams illustrated in FIG. 3 show voltage vectors in the electrical equivalent circuit diagram (at quasi-stationary operating points) for two different electrical angular velocities $\omega_1$, $\omega_2$.

In order to make full use of but not overtax a loading capacity of supply devices Q of the brushless DC motor BM and its windings during start-up of the brushless DC motor BM, it has proved successful to control the inverter WR of the brushless DC motor BM during the start-up process in such a manner that the inverter WR generates a desired value of the phase voltage $U_S$ which causes the brushless DC motor BM to be started up with an electrical power $P_E$ which is approximately constant.

For the purpose of explanation, it is assumed below, without restricting the generality, that the supply voltage U is constant during the start-up process. The inverter WR of the brushless DC motor BM is then controlled during the start-up process in such a manner that it generates a desired value of the phase voltage $U_S$ which causes the brushless DC motor BM to be started up with an approximately constant current consumption $I_A$. In FIG. 3, the current consumption $I_A$ of the brushless DC motor BM at the higher electrical angular velocity $\omega_2$ is therefore the same as its current consumption $I_A$ at the lower electrical angular velocity $\omega_1$ (accordingly $I_2=I_1$). For all values shown in FIG. 3, the index 1 denotes the value at the lower electrical angular velocity $\omega_1$ and the index 2 denotes the value at the higher electrical angular velocity $\omega_2$.

During start-up, the constant current consumption $I_A$ results in a constant (that is to say speed-independent) voltage drop across the non-reactive winding resistor R and in a speed-proportional voltage drop across the stator inductance L of the brushless DC motor BM.

FIG. 3 shows how the phase voltage $U_S$ is composed for two different electrical angular velocities $\omega_2$ and $\omega_1$. For reasons of representation, $\omega_2/\omega_1$=approx. 1.5 was selected for FIG. 3 without restricting the generality. The vector diagrams in FIG. 3 illustrate how the rotor voltage $U_p$ and therefore also the absolute value $|U_S|$ of the phase voltage $U_S$ increase with increasing electrical angular velocity $\omega$ during start-up.

The mechanical load torque generally greatly increases with increasing electrical angular velocity $\omega$. The relationship is typically even cubic in fans and pumps. A current consumption $I_A$ independent of the speed (that is to say a constant torque $M_{ges}$) during steady-state operation is therefore generally not possible but is possible during the start-up phase as long as an excess drive torque can be used to accelerate the mechanical moment of inertia. The acceleration process is ended ($d\omega/dt=0$) as soon as an electrical angular velocity $\omega$ has been reached at which the mechanical load torque is as large as the drive torque and there is therefore no longer an excess drive torque for further acceleration of the mechanical moment of inertia. With its load (not illustrated in the figures), the brushless DC motor BM then has an electrical angular velocity $\omega$ which cannot be increased further (that is to say a stationary operating point) without increasing the current $I_A$ or changing another operating parameter.

All of the embodiment variants have the following in common. The magnetic rotating field generated by the stator winding of the brushless DC motor BM is accelerated with a ramp which is predefined in such a manner that the brushless DC motor BM or its electrical machine EM consumes an electrical power $P_E$ which is approximately constant in the non-blocked state and with a connected mechanical load.

Figure 4:
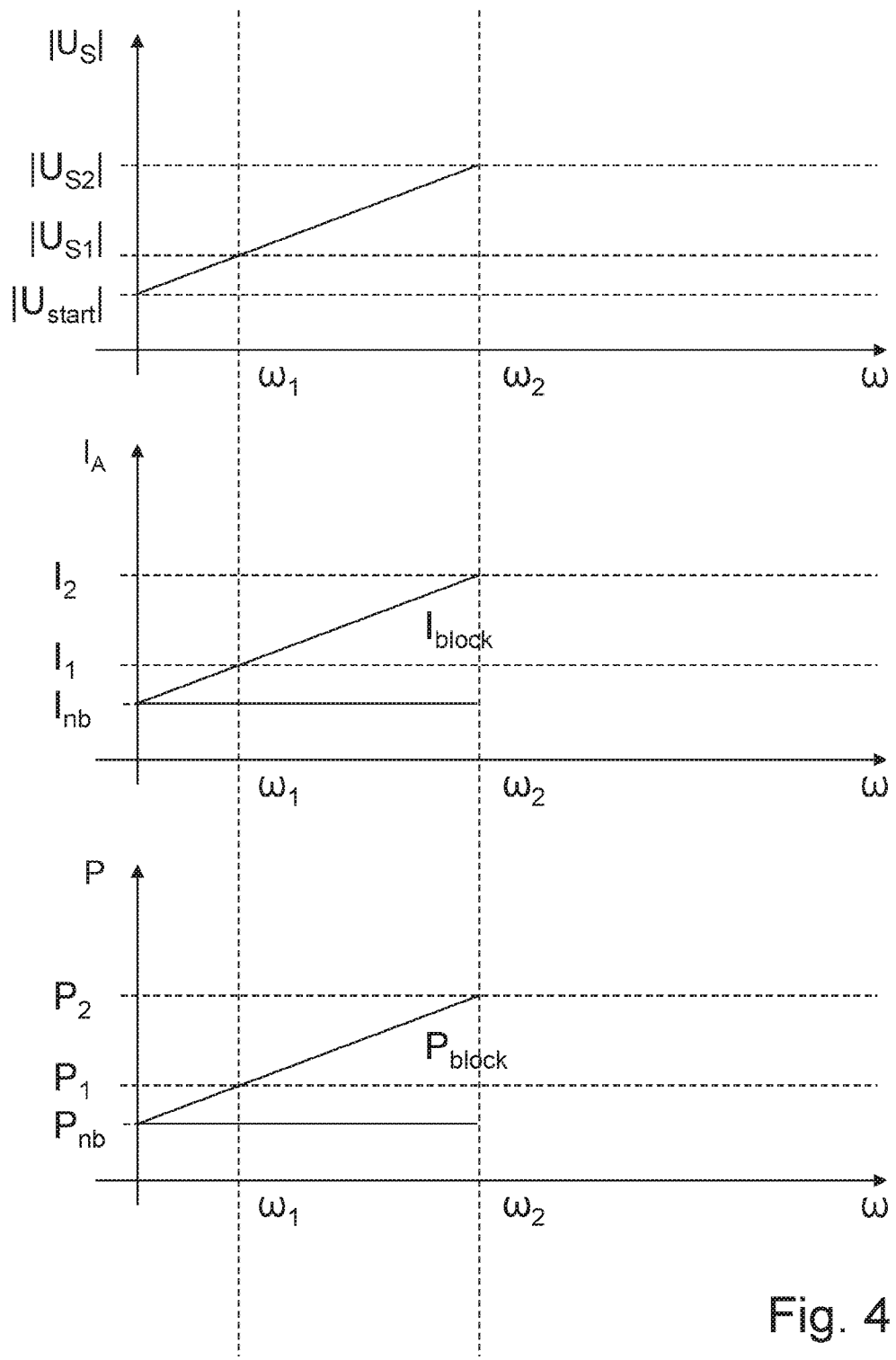
FIG. 4 shows schematic profiles of the phase voltage, current consumption and electrical power against the electrical angular velocity when starting up the brushless DC motor.

FIG. 4 shows profiles of the phase voltage $U_S$, current consumption $I_A$ and power $P_E$ against the electrical angular velocity $\omega$ in a first start-up phase of the brushless DC motor BM. The brushless DC motor BM is a synchronous machine, that is to say the rotor voltage $U_p$ is proportional to the mechanical speed n of the electrical machine EM (see equation 3).

For the purpose of simplification, a current consumption $I_A$ which is approximately constant is assumed below when starting up the brushless DC motor BM. With a constant supply voltage U for the inverter WR, this results in an approximately constant electrical power consumption $P_E$ of the brushless DC motor BM.

The absolute value $|U_S|$ of the phase voltage $U_S$ applied to the electrical machine EM increases in an approximately linear manner with the electrical angular velocity $\omega$, starting from a minimum value $U_{min}$, for the purpose of generating a start-up current $I_{nb}$ for overcoming static friction.

Figure 5:
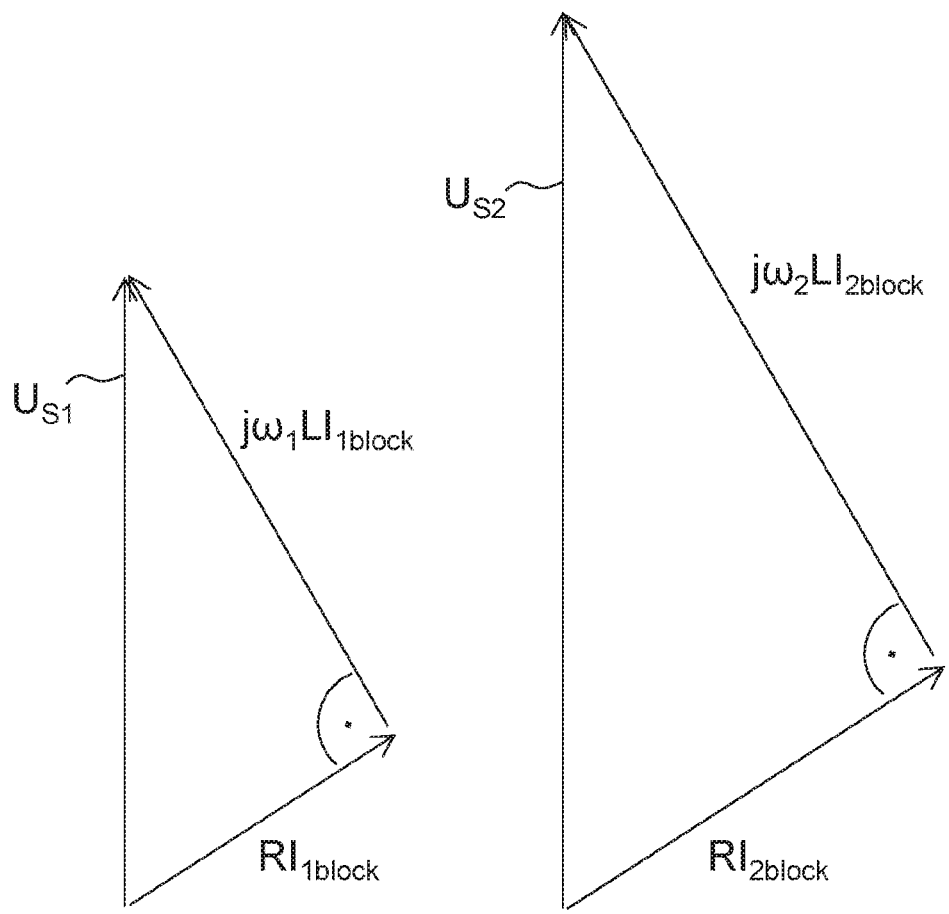
FIG. 5 shows a respective schematic vector diagram for a control state of the brushless DC motor in a blocked state with desired phase voltage values, a resistive voltage drop and an inductive voltage drop for a first and a second electrical angular velocity.

FIG. 5 shows divisions of the supply voltage provided by the direct current source GQ for a control state of the brushless DC motor BM in a blocked state with a first phase voltage $U_{S1}$ for a first electrical angular velocity $\omega_1$ and a second phase voltage $U_Se$ for a second electrical angular velocity $\omega_2$.

For the purpose of explanation, it is assumed below, without restricting the generality, that the supply voltage U is constant during the start-up process. It is also assumed that the inverter WR of the brushless DC motor BM is controlled for an (actually intended) start-up process in such a manner that it generates a phase voltage $U_S$ which, in the absence of a blockage, would cause the brushless DC motor BM to be started up with an approximately constant current consumption $I_A$. If the brushless DC motor BM is blocked, the rotor voltage $U_p$ is zero volts. The entire phase voltage $U_S$ is then dropped across the series circuit comprising the stator inductance L and the winding resistor R, as a result of which the actual current consumption $I_{block}$ of the brushless DC motor BM in the blocked state (in contrast to a start-up process without a blockage) increases in an approximately linear manner with the angular frequency $\omega$ of the phase voltage $U_S$.

Figure 6:
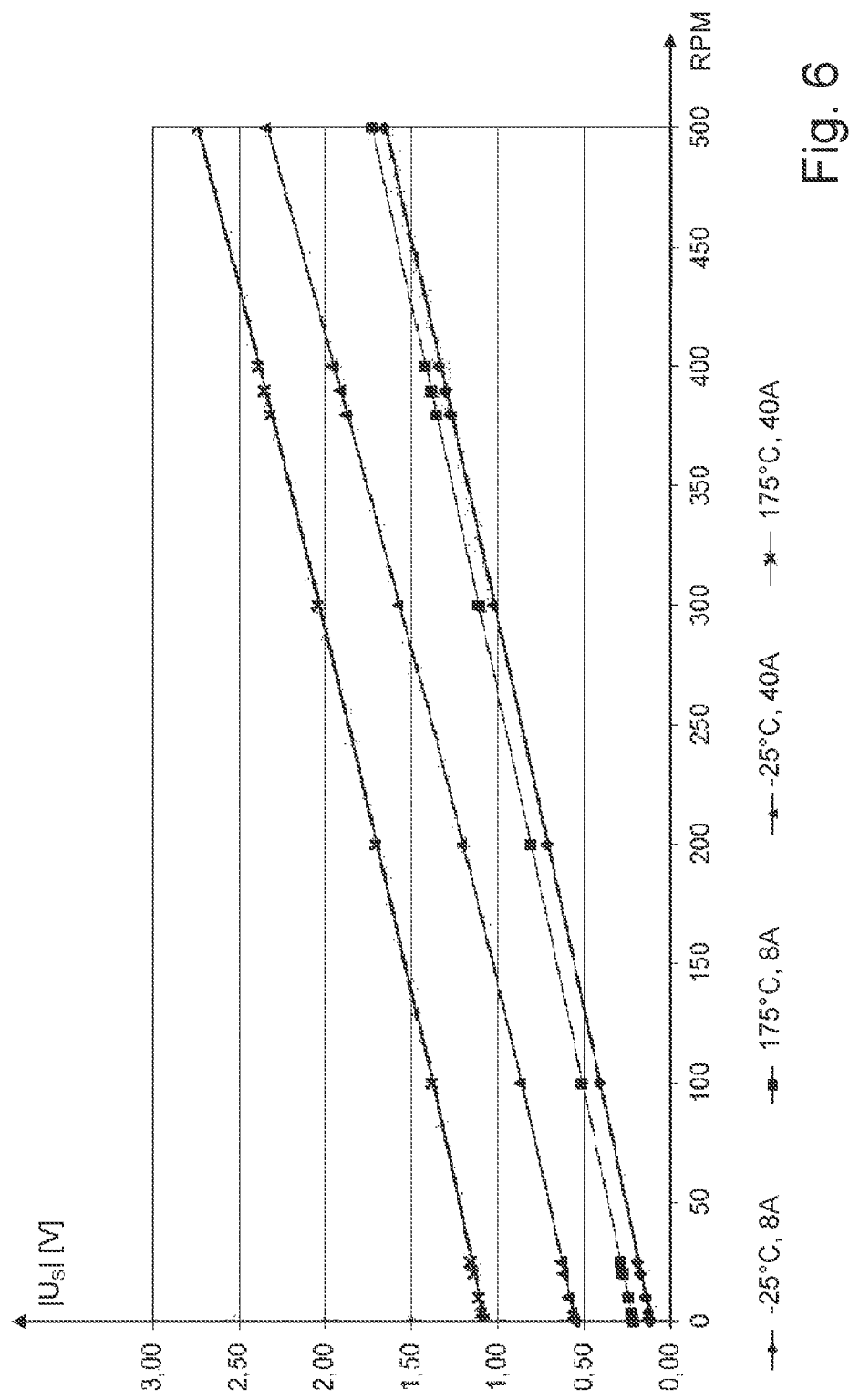
FIG. 6 schematically shows a calculated family of characteristic curves which shows temperature-dependent profiles of the amplitude of the phase voltage against low motor speeds, with which a brushless DC motor is accelerated from a standstill with an approximately constant electrical power.

The family of characteristic curves of the brushless DC motor BM shown in FIG. 6 was determined by means of calculation. The family of characteristic curves shows profiles of an absolute value $|U_S|$ of the phase voltage $U_S$ against a mechanical motor speed n for two different operating temperatures T (−25° C. and 175° C.) and two different current consumptions $I_A$ (8 A and 40 A) if the electrical machine EM of the brushless DC motor BM is accelerated from a standstill with an approximately constant electrical power $P_E$. It can be discerned from this that the profile of the absolute value $|U_S|$ against the angular frequency in is approximately linear for all illustrated operating parameters (that is to say current consumption of 8 A or 40 A and operating temperature of −25° C. or 175° C.). It can also be gathered from the figure that the amplitude value $|U_S|$ of the phase voltage $U_S$ must be increased in a manner approximately proportional to the operating temperature T at operating points with a low electrical angular velocity $\omega$ in order to achieve an unchanged energization state.

Figure 7:
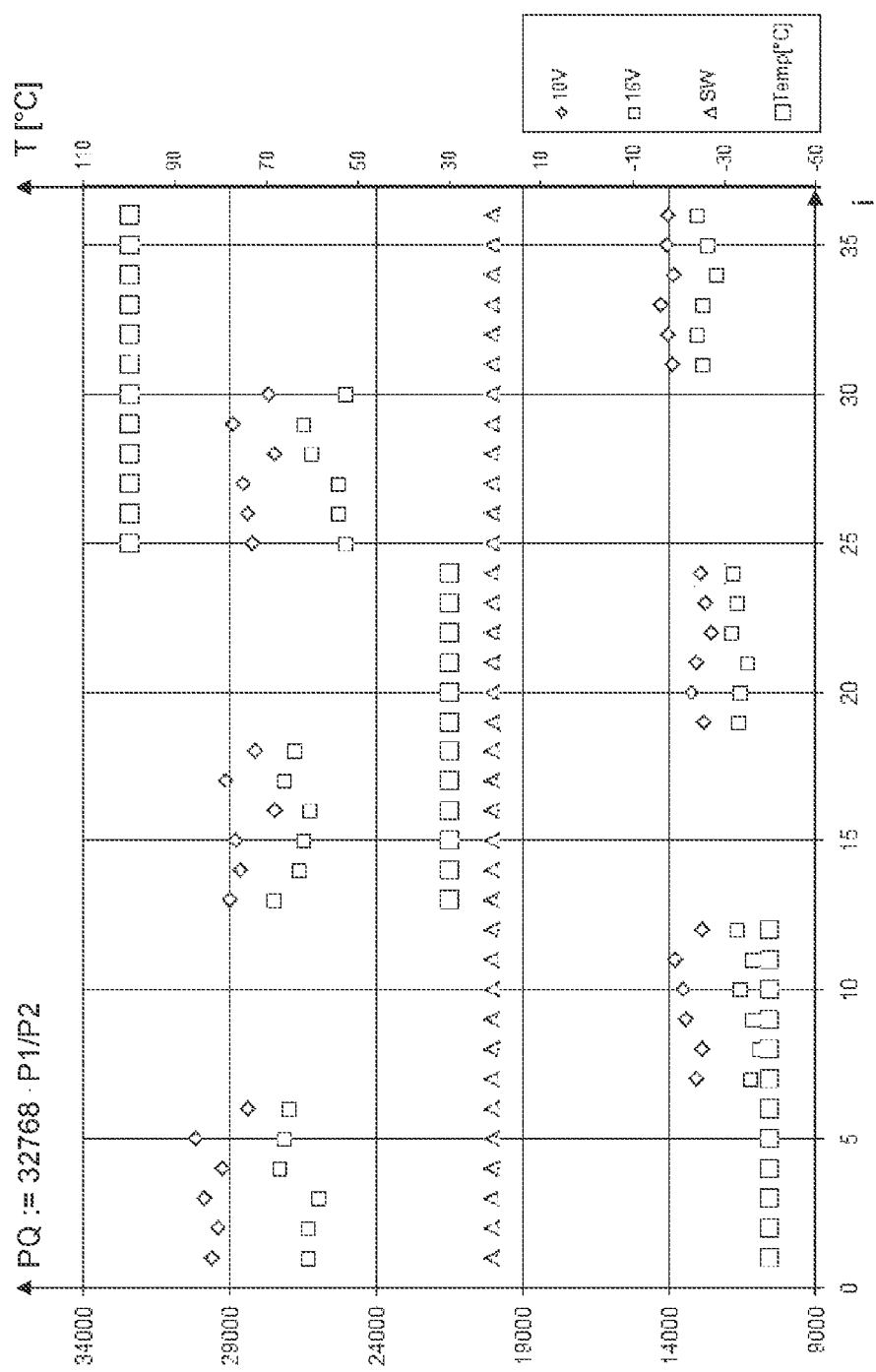
FIG. 7 schematically shows power consumption quotients determined using tests for a supply voltage of 10 V and 16 V and three operating temperatures in each case during start-up without a blockage and in the blocked state.

FIG. 7 shows power consumption quotients $PQ=32768*P_1/P_2$ for different combinations of the supply voltage U and the operating temperature T each determined with and without a blocked state in a total of 36 tests. Without restricting the generality, the power consumption quotient PQ is therefore normalized here with the factor 32768. The abscissa value i is a running index which indicates the respective test. Tests 1 to 6, 13 to 18 and 25 to 30 were carried out in the non-blocked state. Tests 7 to 12, 19 to 24 and 31 to 36 were carried out in the blocked state. Tests 1 to 12 were carried out at an operating temperature T of −40° C. Tests 13 to 24 were carried out at an operating temperature T of 30° C. Tests 25 to 36 were carried out at an operating temperature T of 100° C.

The diagram in FIG. 7 illustrates that the power consumption quotient PQ is much less dependent on the operating temperature T than on whether or not the brushless DC motor BM is mechanically blocked. This is because the power consumption quotients PQ are here always significantly lower than a particular threshold value SW in the blocked state and are always significantly greater than this threshold value SW in the non-blocked state. This can be achieved with a threshold value SW which is independent of the operating temperature T. The concept of the present invention is therefore based on the fact that the power consumption quotient PQ of the power consumptions $P_1$, $P_2$ at two different electrical angular velocities $\omega_1$, $\omega_2$ is particularly suitable for a simple evaluation (by means of a comparison with a constant threshold value and a decision based thereon) as regards whether or not the brushless DC motor BM is blocked.

Figure 8:
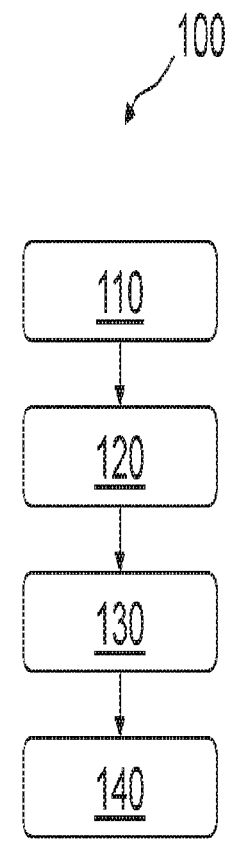
FIG. 8 shows a schematic flowchart of a method for detecting a blocked state of an electrical machine.

FIG. 8 shows a schematic flowchart of a method 100 for detecting a blocked state of an electrical machine EM. The method 100 comprises the following steps. In a first step 110, a first power consumption $P_1$ of the electrical machine EM is determined while a first phase voltage $U_{S1}$ for operating the electrical machine EM at a first rotating field speed is applied to the electrical machine EM. In a second step 120, a second power consumption $P_2$ of the electrical machine EM is determined while a second phase voltage $U_{S2}$ for operating the electrical machine EM at a second rotating field speed is applied to the electrical machine EM. In a third step 130, a power quotient PQ between the first power consumption $P_1$ and the second power consumption $P_2$ is calculated. In a fourth step 140, the power quotient PQ is compared with a threshold value SW for the power quotient PQ. The inverter controller WS is preferably set up to move the rotor L to a defined starting rotor position before the rotor L is accelerated by energizing the stator S.

The proposed method 100 has the advantage that the power quotient PQ, as a criterion for deciding whether or not the brushless DC motor BM is blocked, is largely independent of an operating temperature T of the brushless DC motor BM. This is because the operating temperature T has an effect on the numerator and denominator of the power quotient PQ at least in the same sense (although strictly speaking not in a proportional manner). Therefore, the influence of the operating temperature T and systematic errors in the power values are largely minimized as a result when calculating the power quotient PQ.

The invention claimed is:

1. An electrical system comprising:
a brushless direct current motor;
a controller coupled to the brushless direct current motor and configured to:
determine a first power consumption of the brushless direct current motor while a first phase voltage for operating the brushless direct current motor at a first rotating field speed is applied to the brushless direct current motor,
determine a second power consumption of the brushless direct current motor while a second phase voltage for operating the brushless direct current motor at a second rotating field speed is applied to the brushless direct current motor,
calculate a power quotient between the first power consumption and the second power consumption,
compare the power quotient with a threshold value for the power quotient and output a comparison result, and
determine the brushless direct current motor is in the blocked state based on the comparison result thereby improving detection of the blocked state of the brushless direct current motor.

2. The electrical system as claimed in claim 1, wherein the brushless direct current motor includes an inverter coupled to the controller and wherein the controller is further configured to determine an actual current consumption of the brushless direct current motor using a current sensor and the controller determines the first power consumption taking into account the actual current consumption determined by the current sensor and wherein the controller is further configured to determine a current consumption of the inverter driving the brushless direct current motor and the controller determines the second power consumption taking into account the current consumption of the inverter.

3. The electrical system as claimed in claim 1, further comprising a temperature sensor for determining a temperature of the brushless direct current motor and
the controller is further configured to determine the threshold value taking into account the temperature of the brushless direct current motor determined by the temperature sensor.

4. The electrical system as claimed in claim 1 wherein the brushless direct current motor has an inverter and the controller is further configured to generate a first control signal for operating the brushless direct current motor at the first rotating field speed and a second control signal for operating the brushless direct current motor at the second rotating field speed.

5. A drive, ventilation or air-conditioning system equipped with electrical system of claim 1.

6. The electrical system as claimed in claim 1, wherein the controller is further configured to abort a start-up process of the brushless direct current motor in response to the brushless direct current motor being in the blocked state.

7. The electrical system as claimed in claim 1, wherein the controller is further configured to activate an energization scheme for releasing the brushless direct current motor from the blocked state in response to the brushless direct current motor being in the blocked state.

8. The electrical system as claimed in claim 1, wherein the controller is further configured to:
increment an error memory in response to the brushless direct current motor being in the blocked state, and
decrement the error memory in response to the brushless direct current motor not being in the blocked state.

9. The electrical system as claimed in claim 2, wherein the controller is further configured to determine a supply voltage for the brushless direct current motor using a voltage sensor and the controller determines the first power consumption taking into account the supply voltage determined by the voltage sensor and wherein the a voltage applied to the inverter for the brushless direct current motor and the controller determines the second power consumption taking into account the voltage applied to the inverter.

10. A vehicle having the drive, ventilation or air-conditioning system of claim 5.

11. The electrical system as claimed in claim 6, wherein the controller is further configured to continue the start-up process of the brushless direct current motor in response to the brushless direct current motor not being in the blocked state for a predetermined period of time.

12. The electrical system as claimed in claim 6, wherein the controller is further configured to initiate an actual run-up process of the brushless direct current motor following the start-up process in response to the brushless direct current motor not being in the blocked state for a predetermined period of time.

13. The electrical system as claimed in claim 9, wherein the controller is further configured to:
determine the first power consumption by multiplying the actual current consumption of the brushless direct current motor by the supply voltage determined by the voltage sensor, and
determine the second power consumption by multiplying the current consumption of the inverter by the voltage applied to the inverter.

14. An electrical system comprising:
a brushless direct current motor including an inverter coupled to the brushless direct current motor;
a controller including an inverter controller coupled to the inverter and configured to generate a first control signal for the inverter for operating the brushless direct current motor at a first rotating field speed and generate a second control signal for the inverter for operating the brushless direct current motor at a second rotating field speed;

the controller configured to:
- determine a first power consumption of the brushless direct current motor while a first phase voltage for operating the brushless direct current motor at a first rotating field speed is applied to the brushless direct current motor,
- determine a second power consumption of the brushless direct current motor while a second phase voltage for operating the brushless direct current motor at a second rotating field speed is applied to the brushless direct current motor,
- calculate a power quotient between the first power consumption and the second power consumption,
- compare the power quotient with a threshold value for the power quotient and output a comparison result, and
- determine the brushless direct current motor is in the blocked state based on the comparison result thereby improving detection of the blocked state of the brushless direct current motor.

15. A method for detecting a blocked state of a brushless direct current motor of an electrical system including a controller coupled to the brushless direct current motor and configured to execute the following steps:
- determining a first power consumption of the electrical machine while a first phase voltage for operating the brushless direct current motor at a first rotating field speed is applied to the brushless direct current motor;
- determining a second power consumption of the electrical machine while a second phase voltage for operating the brushless direct current motor at a second rotating field speed is applied to the brushless direct current motor;
- producing a power quotient between the first power consumption and the second power consumption;
- comparing the power quotient with a threshold value for the power quotient and output a comparison result; and
- determining the brushless direct current motor is in the blocked state based on the comparison result thereby improving detection of the blocked state of the brushless direct current motor.

* * * * *